(12) United States Patent
Wang

(10) Patent No.: US 12,331,876 B1
(45) Date of Patent: Jun. 17, 2025

(54) ACCESSIBLE MOUNTING STRUCTURE

(71) Applicant: Wangs Alliance Corporation, Port Washington, NY (US)

(72) Inventor: Qianxiang Wang, Great Neck, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 19/010,610

(22) Filed: Jan. 6, 2025

Related U.S. Application Data

(60) Provisional application No. 63/705,851, filed on Oct. 10, 2024.

(51) Int. Cl.
 *F21V 23/00* (2015.01)
 *F16M 13/02* (2006.01)

(52) U.S. Cl.
 CPC ........... *F16M 13/02* (2013.01); *F21V 23/006* (2013.01)

(58) Field of Classification Search
 CPC ........... F21S 8/026; F21S 2/005; F21V 15/01; F21V 23/006; F21V 23/008; F21V 23/009
 See application file for complete search history.

(56) References Cited

U.S. PATENT DOCUMENTS

| | | | |
|---|---|---|---|
| 7,108,394 B1 * | 9/2006 | Swarens | F21S 8/026 362/147 |
| 8,708,522 B2 * | 4/2014 | Wang | F21V 15/01 362/372 |
| 9,506,611 B2 | 11/2016 | Ramirez | |
| 10,274,176 B2 * | 4/2019 | Stathes | F21V 21/28 |
| 11,231,167 B2 * | 1/2022 | Jeswani | F21V 23/06 |
| 11,454,382 B1 * | 9/2022 | Wong | F21V 21/108 |
| 11,629,853 B1 * | 4/2023 | Wong | F21V 29/73 362/373 |
| 11,873,970 B2 * | 1/2024 | Jones | F21V 23/009 |
| 12,196,390 B1 * | 1/2025 | Cohen | F21V 23/02 |
| 2009/0290343 A1 * | 11/2009 | Brown | F21K 9/00 362/294 |
| 2013/0272003 A1 * | 10/2013 | Miletich | F21V 23/007 362/382 |
| 2023/0315169 A1 | 10/2023 | Zhou et al. | |
| 2024/0369209 A1 * | 11/2024 | Menendez | F21V 21/15 |
| 2024/0392953 A1 * | 11/2024 | Gunashekaran | F21S 8/026 |

* cited by examiner

*Primary Examiner* — Bradley Duckworth
(74) *Attorney, Agent, or Firm* — Weiss & Arons LLP

(57) ABSTRACT

Apparatus for mounting an accessory may include a bracket and a mounting base. The bracket may be configured to be fixed in an interior of a housing that defines an aperture for receiving a fixture. The mounting base may be configured to receive the accessory in the interior of the housing, spaced apart from the fixture. The mounting base may also be configured to be engaged with and disengaged from the bracket, and removed from the housing through the aperture.

30 Claims, 8 Drawing Sheets

ACCESSIBLE MOUNTING STRUCTURE

CROSS-REFERENCE TO RELATED APPLICATIONS

This is a nonprovisional of U.S. Provisional Application No. 63/705,851, filed on Oct. 10, 2024, which is hereby incorporated herein by reference in its entirety.

BACKGROUND

A fixture may be installed in an architectural structure. The structure may include a wall. The structure may include a ceiling. The fixture may be enclosed in or behind a portion of the architectural structure. Without demolishing, in part or in whole, the architectural structure, the fixture may be accessible to a user only through an opening in the architectural structure that corresponds to a location in which light from the light source may emerge into an architectural space that is to be illuminated by the fixture. Accessories to the fixture may thus be difficult to service or replace.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
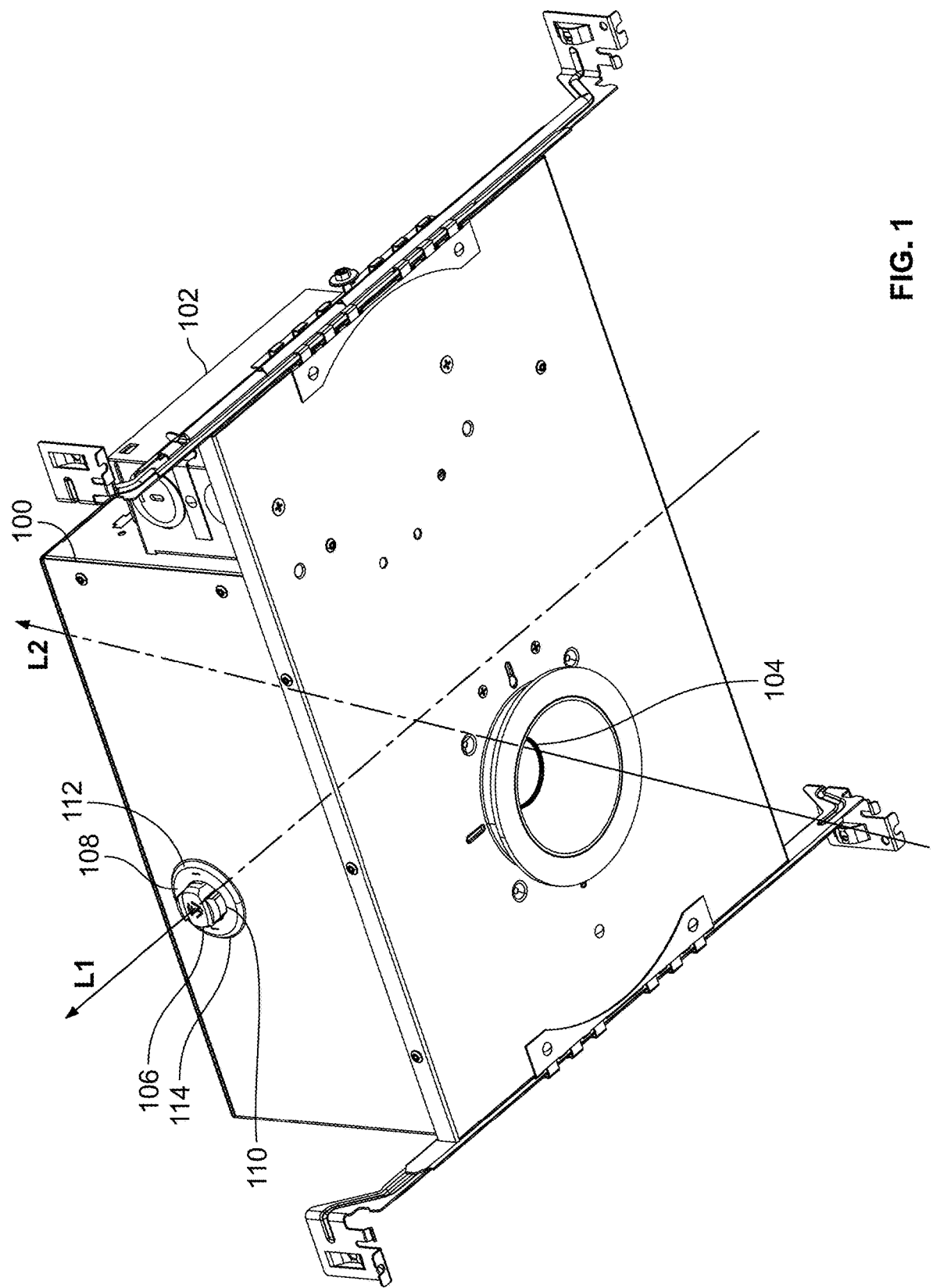
FIG. 1 shows schematically illustrative apparatus in accordance with the principles of the invention.

Apparatus and methods for mounting an accessory are provided. The apparatus may include a bracket. The apparatus may include a mounting base.

The bracket may be configured to be fixed in an interior of a housing. The housing may be designed for installation in an architectural structure, such as a wall or ceiling. The housing may define an aperture. The aperture may be configured to receive a fixture. The fixture may, for example, include a lighting assembly that emits light. Other illustrative fixtures include fans, audio speakers, sensors, monitoring devices, climate control devices, or any other suitable fixture that may be received in an aperture of a housing.

The aperture may facilitate installation and removal of the fixture from the housing without destruction of the architectural structure and without removing the housing from the architectural structure. The aperture, in certain embodiments, be an access hole that may provide access to an interior of the housing. The access hole may provide access to the accessory. A cap may plug the access hole when the access hole is not in active use.

When installed in the architectural structure, the aperture may align with an opening in the architectural structure. The opening in the architectural structure may facilitate removal of the fixture from the housing without removal of the housing from the architectural structure. The aperture in the housing may facilitate extension of the fixture from within the housing to outside the housing. The opening in the architectural structure may facilitate extension of the fixture from within the housing to outside the architectural structure.

The aperture in the housing may facilitate emissions from the fixture to outside the housing. The aperture in the housing may facilitate emissions from the fixture to outside the architectural structure. This may include emission via the opening in the architectural structure. For example, in the case of a fixture that includes a lighting assembly, the aperture may receive the lighting assembly in the housing and may facilitate emission of light outside the housing. The light may be emitted outside the architectural structure and into or onto a space (e.g., a room, wall, floor, path, etc.) beyond the architectural structure.

The mounting base may be configured to receive the accessory. The accessory may include a cartridge that houses components of the accessory. The accessory may include circuitry. The accessory may include an antenna. The accessory may include a receiver. The accessory may include a transmitter. The accessory may include a transceiver. The accessory may include a transponder.

Details relating to the accessory and its interaction with the mounting base are described in commonly assigned U.S. patent application Ser. No. 19/010,533 entitled CIRCUIT CARTRIDGE, filed on even date herewith, which is hereby incorporated by reference herein in its entirety.

The accessory may support communication. The accessory may support wireless communication. The accessory may support communication via a wired communication protocol. The communication may include radio, microwave, cellular, Bluetooth, WiFi, or other suitable wireless communication protocol. The communication may include a power line communication protocol. The communication may include a digital multiplex (DMX) protocol.

The accessory may include a fixture control circuit. The fixture control circuit may be configured to control one or more fixtures. The accessory may include a sensor. The accessory may include a monitoring device. The accessory may include a climate control device, such as a fan or heating element for controlling temperature in the housing. The accessory may support power provision or control. The accessory may, for example, include a circuit breaker. The accessory may include components that support networking, such as a local area network (LAN) or a wide area network (WAN). The accessory may include any suitable component that may be advantageous to install in a housing. The accessory may include any suitable component that may be advantageous to install proximal to a fixture.

Receiving the accessory at the mounting base may include mounting the accessory. Receiving the accessory at the mounting base may include engaging the accessory. Receiving the accessory at the mounting base may include supporting the accessory. The accessory may, for example, snap into the mounting base. The accessory may screw into the mounting base. The accessory may mount in the mounting base with a friction engagement. The accessory may be mounted in the mounting base via one or more tabs or catches that hold the accessory in place. The mounting base may, in some embodiments, be configured to releasably receive the accessory.

When received at the mounting base, the accessory may be positioned, in full or in part, in the interior of the housing. The accessory may be positioned spaced apart from the fixture, or apart from where the fixture would be positioned when installed in the housing. The accessory may be positioned spaced apart from the aperture. The mounting base may be configured to support the accessory in a position in which at least some of the accessory is outside the housing.

The mounting base may define a receptacle that is configured to receive the accessory. The receptacle may be configured to support the accessory.

The mounting base may include a knockout plug. The knockout plug may occlude the receptacle. The knockout plug may be configured to be removed from the mounting base to receive the accessory.

The mounting base may include a through-hole. The through-hole may pass through the receptacle. The through-hole may, in some embodiments, be exposed with removal of the knockout plug. In other embodiments the through-hole may be exposed without removal of a knockout plug. When exposed, the through-hole may receive the accessory.

The mounting base may be configured to align the through-hole with an orifice in the housing. For example, when the mounting base is engaged with the bracket fixed in the housing, the through-hole may be aligned with the orifice. The through-hole may be positioned to fit into the orifice. The through-hole may be positioned to pass through the orifice. In some embodiments, the mounting base may be configured to position the through-hole outside the housing. Such positioning may occur when the mounting base is fully engaged with the bracket. Such positioning may occur when a flange of the mounting base abuts a panel of the housing.

The mounting base may include a projection. The projection may be configured to position the through-hole outside the housing. Such positioning may occur when the mounting base is fully engaged with the bracket. Such positioning may occur when a flange of the mounting base abuts a panel of the housing.

The mounting base may include a flange. The flange may be configured to limit a distance at which the projection can extend outside the housing. The flange may be configured to abut a panel of the housing. The flange may be configured to abut the panel around a perimeter of the orifice.

The mounting base may be configured to be engaged with and disengaged from the bracket. In certain embodiments, the mounting base may be configured to be in sliding engagement with the bracket. The bracket may, for example, include one or more rails. The bracket may include a set of two or more rails installed in parallel. The mounting base may be configured to engage with and slide along the rails. The bracket may include one or more tabs. The mounting base may be configured to engage with the tabs. The mounting base may be configured to slide into or along the tabs. The mounting base may be configured to attach to or snap into the tabs.

The mounting base may be configured to be removed from the housing. Removal from the housing may be accomplished through the aperture. The mounting base may be configured to be withdrawn from the housing, via the aperture, after removal of a cap which may be plugging the aperture or a fixture that may fully or partially occlude the aperture when installed in the housing. The mounting base may be configured to retain the accessory when the mounting base is removed from the housing via the aperture.

The mounting base may be configured to be removed from the housing when the housing is installed behind an architectural structure. Installation of the housing behind an architectural structure may, in some embodiments, include installation of the housing partially behind, within, or entirely behind the architectural structure.

The apparatus may be configured so that removal of the mounting base from the housing may not require demolition of the architectural structure. The apparatus may be configured so that removal of the mounting base from the housing may not require removal of the housing from in or behind the architectural structure.

The architectural structure may include drywall. The architectural structure may include wood panel. The architectural structure may include brick, cement, or other suitable material in or behind which a housing, such as one designed to receive an accessory or a fixture, may be installed.

The mounting base may include an engagement surface. The engagement surface may be configured to receive a tool. The tool may be configured to displace the mounting base while the mounting base is engaged with the bracket.

The mounting base may include a slider. The slider may be configured to slide relative to a panel of the housing. The slider may be configured to engage with the bracket, which may be installed on the panel. The slider may be configured to slide along the bracket. The slider may be configured to slide into the bracket. The slider may include a flat surface. The engagement surface may extend transverse the slider.

The engagement surface may be configured to maintain engagement with the tool after the tool disengages the mounting base from the bracket. The engagement with the tool may include magnetic attraction. The engagement surface may, for example, include ferromagnetic material such as iron, cobalt, nickel, or an alloy thereof. The tool may include ferromagnetic material. In some embodiments, the engagement with the tool may be non-magnetic.

The engagement with the tool may include mechanical interference (e.g., via a tight fit, torque, friction, or other mechanical interaction) between the engagement surface and the tool. The engagement surface may, in certain embodiments, define a recess. The recess may be configured to receive the tool. The tool may fit snugly within the recess. Rotation of the tool about a longitudinal or perpendicular axis may contribute to engagement of the tool with the engagement surface. The engagement may also utilize gravitational force exerted when the engagement surface is above the tool.

The engagement with the tool may be configured to manipulate the mounting base through the aperture.

The mounting base may include a distal end in which a receptacle configured to receive the accessory is disposed. The mounting base may include a proximal end that is opposite the distal end. The engagement with the tool may be configured to manipulate the mounting base through the aperture, proximal end first. In some embodiments, the engagement with the tool may be configured to manipulate the mounting base through the aperture, distal end first. Even when manipulation of the mounting base through the aperture is configured to be performed with the distal end first, disengagement of the mounting base from the bracket may, in certain embodiments, be performed with the proximal end first. The mounting base may then be rotated so that the distal end faces the aperture for removal from the housing.

In some embodiments, removal of the mounting base from the housing through the aperture may be accomplished by hand. For example, in certain embodiments, a hand may be able to fit through the aperture and manually remove the mounting base from the bracket (e.g., rails) and remove the mounting base via the aperture. In some embodiments, the aperture may be too small for a hand to pass through, and the tool may facilitate removing the mounting base from the bracket and bringing the mounting base close enough to the aperture such that the mounting base can be manually grasped and removed via the aperture.

The mounting base may include a first segment that operationally is positioned flush against a first panel of the housing. The mounting base may include a second segment that operationally is positioned flush against a second panel of the housing. The second panel may not be co-planar with the first panel. The second panel may be orthogonal to the first panel. In some embodiments, it may be considered that the first panel and the second panel are orthogonal or not co-planar when the panels are primarily orthogonal or not co-planar, even if one of the panels may have a small portion that curves to form an overlapped connection with the other panel.

A receptacle configured to receive the accessory may be disposed in the first segment. The receptacle may include or consist of a through-hole. The receptacle may include or consist of a projection. The receptacle may include or consist of a flange. A slider that is configured to slide relative to the second panel may be disposed in the second segment. The first segment may, in certain embodiments, not engage the bracket.

The apparatus may also include a fastener. The fastener may have a shank. The mounting base may include a slider that is configured to slide relative to a panel of the housing. The slider may define a slot that is sized for clearance of the shank. The slot may, for example, allow the slider to slide relative to the panel while the shank of the fastener passes through the slot. The housing may be configured to receive the fastener in a position in which the fastener is adjustable by an elongated linear tool inserted through the aperture. The elongated linear tool may be a specialty tool provided with the apparatus. The elongated linear tool may be a general-purpose tool, such as a hex key or screwdriver. The screwdriver may include a flat-head tip. The screwdriver may include a Philips-head tip. The fastener may be configured to fix the mounting base relative to the housing.

The slider may define a release hole that is configured to pass a head of the fastener when the release hole is aligned with the fastener. Alignment of the release hole with the fastener may be configured to occur after the mounting base is displaced, via the tool, along the bracket in a direction away from the orifice of the housing. Passing the head of the fastener when the release hole is aligned with the fastener may facilitate disengagement of the mounting base from the bracket.

The apparatus may also be configured to provide installation of the mounting base through the aperture and onto the bracket in the housing. Installation of the mounting base may be implemented by reversing an operation described herein to remove the mounting base. For example, the tool may engage with the engagement surface to manipulate the mounting base from outside the housing through the aperture and into the housing, and then engage the mounting base with the bracket. This installation process may also be accomplished when the housing is installed in or behind the architectural structure without removal of the housing or demolition of the architectural structure.

Illustrative embodiments of apparatus and methods in accordance with the principles of the invention will now be described with reference to FIGS. 1-8, which form a part hereof. It is to be understood that other embodiments may be utilized and that structural, functional and procedural modifications or omissions may be made without departing from the scope and spirit of the present invention.

The leftmost digit of a three-digit reference numeral (e.g., "1" of "102"), and the two leftmost digits of a four-digit reference numeral (e.g., "11" of "1102"), generally identify the first figure in which a part is called-out.

FIG. 1 shows an illustrative apparatus in accordance with the principles of the invention. The apparatus may be configured to be installed in housing 100. Junction box 102 may also be installed in or on housing 100. The housing may be configured to receive fixture 104. Fixture 104 may, in certain embodiments, include a lighting assembly. The lighting assembly may include an LED light source (not shown). Housing 100 may be configured to be mounted in an architectural structure such as a wall or a ceiling.

The apparatus may include mounting base 108 (shown partially in the view of FIG. 1). Mounting base 108 may include through-hole 110 and projection 112. Mounting base 108 may support accessory 106. Accessory 106 may be an accessory to fixture 104 and may perform a function that is desirable to perform outside housing 100. Mounting base 108 may support accessory 106 in a position in which accessory 106 extends beyond housing 100. Mounting base 108 may support accessory 106 in a position in which accessory 106 is disposed near orifice 114 of housing 100. For example, accessory 106 may include an antenna or a sensor that is to be deployed outside housing 100 or near orifice 114. Such positioning may reduce or eliminate interference of housing 100 with performance of the function of accessory 106.

Mounting base 108 may sit in or extend through orifice 114. Orifice 114 may be round. Orifice 114 may have any suitable shape.

Figure 2:
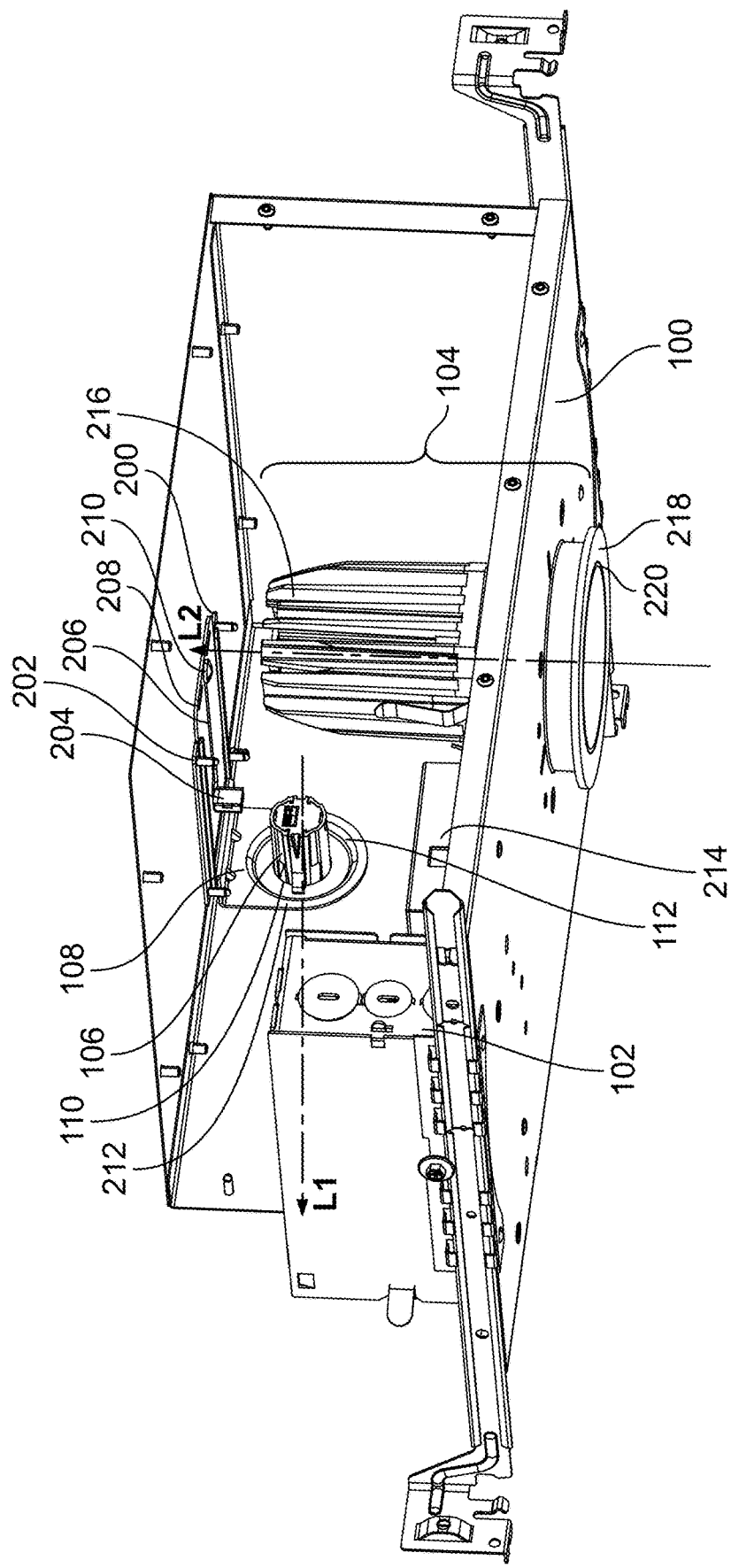
FIG. 2 shows schematically illustrative apparatus in accordance with the principles of the invention.

FIG. 2 shows an illustrative apparatus in accordance with the principles of the invention. The apparatus may include a bracket. The bracket may include rails, such as right rail 200 and left rail 202. Mounting base 108 may engage with and be supported by the rails. For example, mounting base 108 may include slider 208. Slider 208 may be configured to slide along the rails. Mounting base 108 may include engagement surface 204. Engagement surface 204 may be configured to receive a tool. The tool may be a blade-like tool that includes a flat of blade-like tip. The tool may be a specialized tool that may be provided with the apparatus. The tool may be a general-purpose tool, such as a hex key or screwdriver. The screwdriver may include a flat-head tip. The screwdriver may include a Philips-head tip. Engagement of the tool with engagement surface 204 may facilitate movement of mounting base 108 (e.g., along rails 200 and 202, and in and out of housing 100).

While engaged with rails 200 and 202, slider 208 may be fastened in place against housing 100 with fastener 210. Fastener 210 may include a screw. When fastener 210 is adjusted (e.g., the screw is loosened), slider 208 may be slid along rails 200 and 202 in a direction along the L1 axis. Fastener 210 may be adjusted (e.g., tightened and loosened) via an elongated linear tool. The elongated linear tool may be a specialized tool that may be provided with the apparatus. The tool may be a general-purpose tool, such as a hex key or screwdriver. The elongated linear tool may be the same as the tool configured to engage with engagement surface 204. The elongated linear tool may be different than the tool configured to engage with engagement surface 204.

The tool configured to engage with engagement surface 204 may be used to move mounting base 108 (e.g., including sliding mounting base 108 along rails 200 and 202). Mounting base 108 may include slot 206. Slot 206 may be sized for clearance of a shank portion of fastener 210. Slot 206 may thereby accommodate motion of mounting base 108 relative to the fastener 210. Fixture 104 may be removed to provide room for movement, including removal and installation, of mounting base 108.

Mounting base 108 may include flange 212. Flange 212 may be positioned to abut a panel of housing 100.

Fixture 104 shown in FIG. 2 may be an illustrative example of a lighting assembly that may include heat sink 216, trim 218, and collar 220. FIG. 2 also shows circuit box 214 disposed in housing 100.

Figure 3:
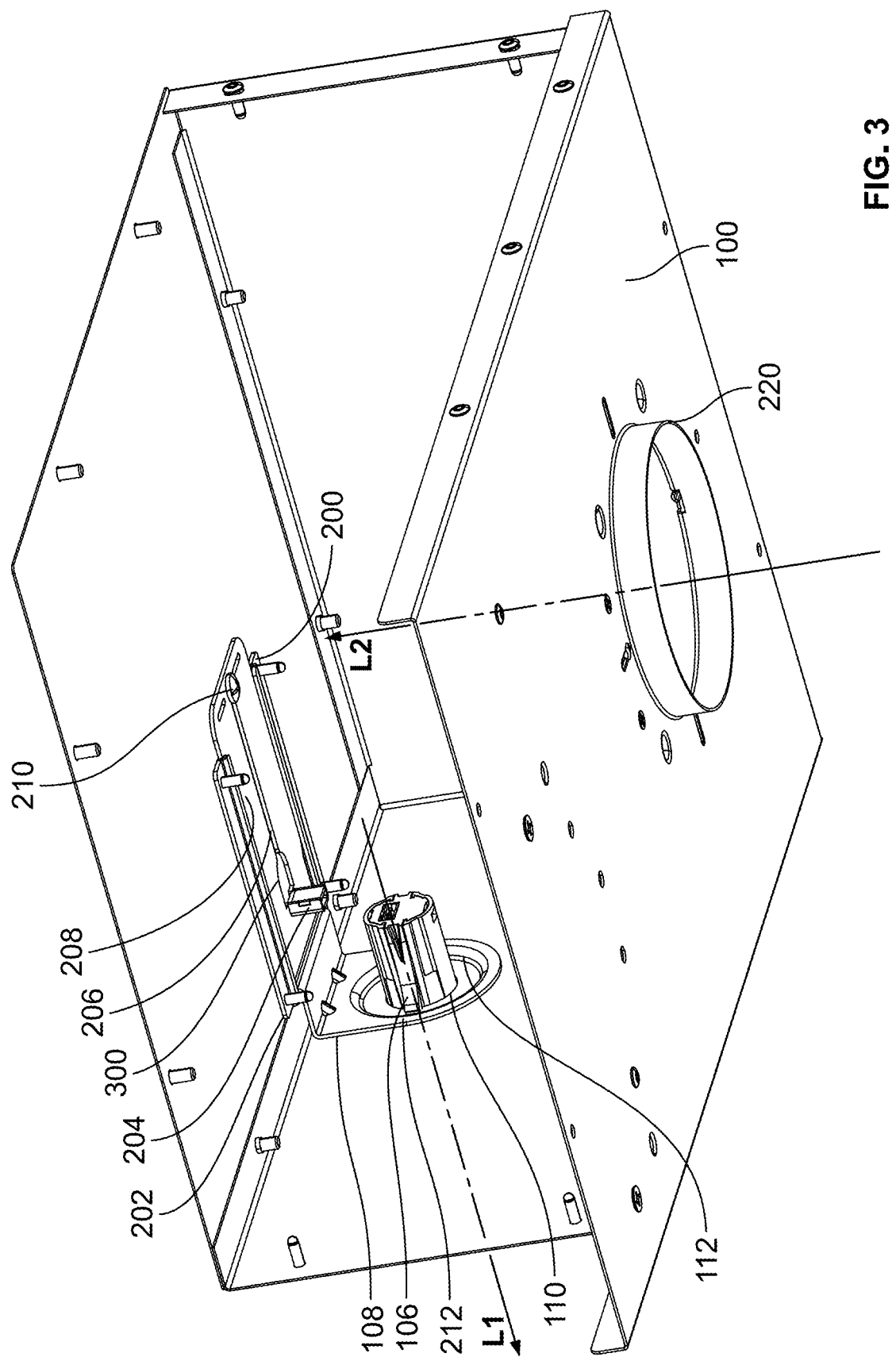
FIG. 3 shows schematically illustrative apparatus in accordance with the principles of the invention.

FIG. 3 shows an illustrative apparatus in accordance with the principles of the invention. Slider 208 may include release hole 300. Release hole 300 may be configured to pass a head of fastener 210 when release hole 300 is aligned with fastener 210. Release hole 300 may thereby be configured to allow slider 208 to be lowered below a head of the screw fastener 210. This may facilitate disengagement of mounting base 108 from the bracket (including, for example, rails 200 and 202) and removal of mounting base 108 from housing 100.

Figure 4:
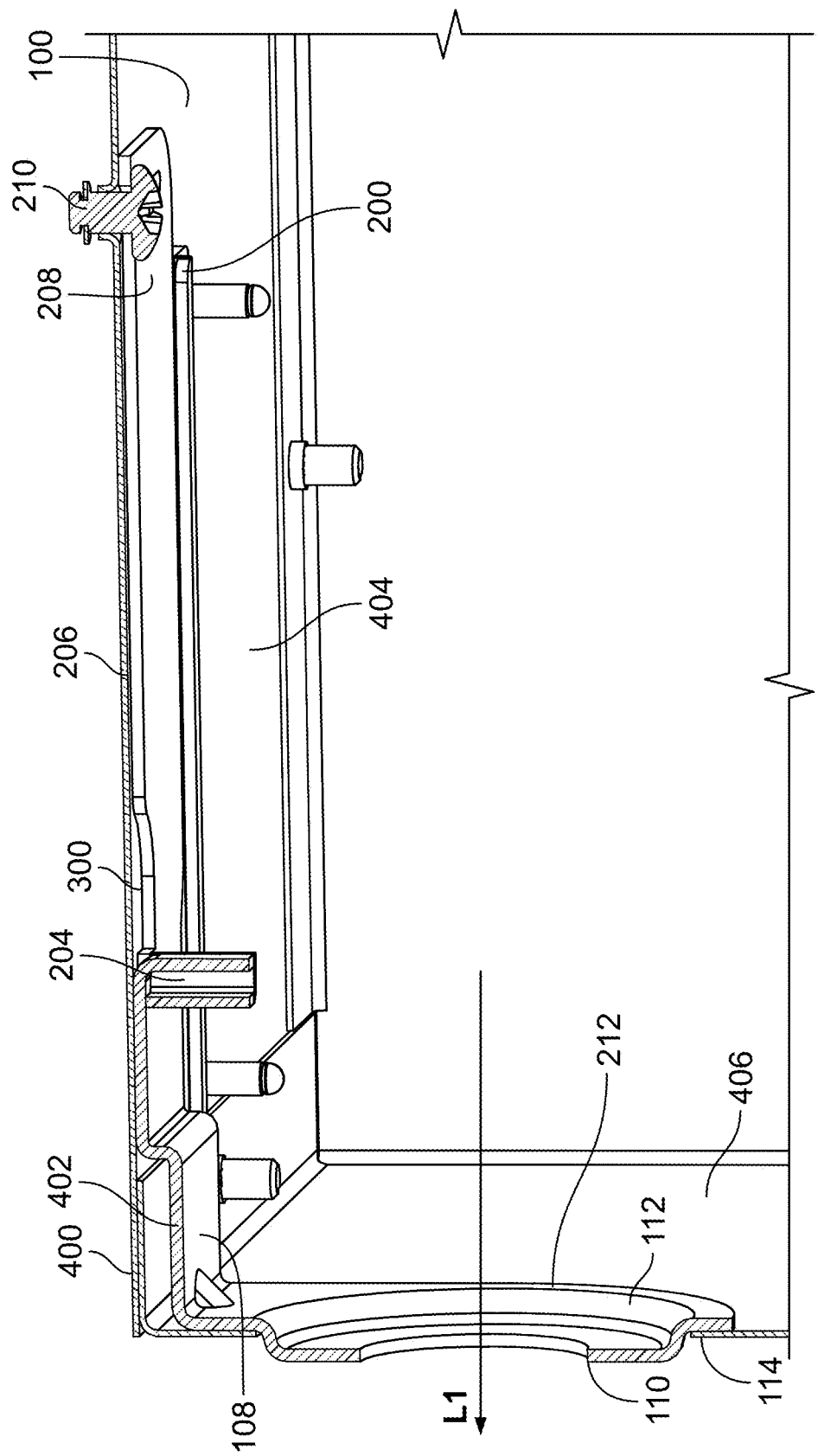
FIG. 4 shows schematically illustrative apparatus in accordance with the principles of the invention.

FIG. 4 shows an illustrative apparatus in accordance with the principles of the invention. FIG. 4 is a partial cross section through mounting base 108 and housing 100. Mounting base 108 may include positioning bracket 402 that positions projection 112 relative to slider 208. Slider 208 may have a width (normal to the plane of the cross section) that is greater than the width of positioning bracket 402 (see, e.g., the view in FIG. 5). Rails 200 and 202 may thus engage slider 208 but not positioning bracket 402.

FIG. 4 also shows that housing 100 may include first housing panel 406 and second housing panel 404. First housing panel 406 and second housing panel 404 may be orthogonal. First housing panel 406 and second housing panel 404 may be considered orthogonal even if one of the panels (e.g., first housing panel 406) includes a portion that curves to overlap with second housing panel 404 (shown as overlapping junction 400) at a junction between the two panels.

FIG. 4 also shows projection 112 fitting into and through orifice 114, thereby extending through-hole 110 outside of housing 100. Flange 212 is shown abutting panel 406 around a perimeter of orifice 114, thereby preventing further movement of mounting base 108 in the L1 direction.

Figure 5:
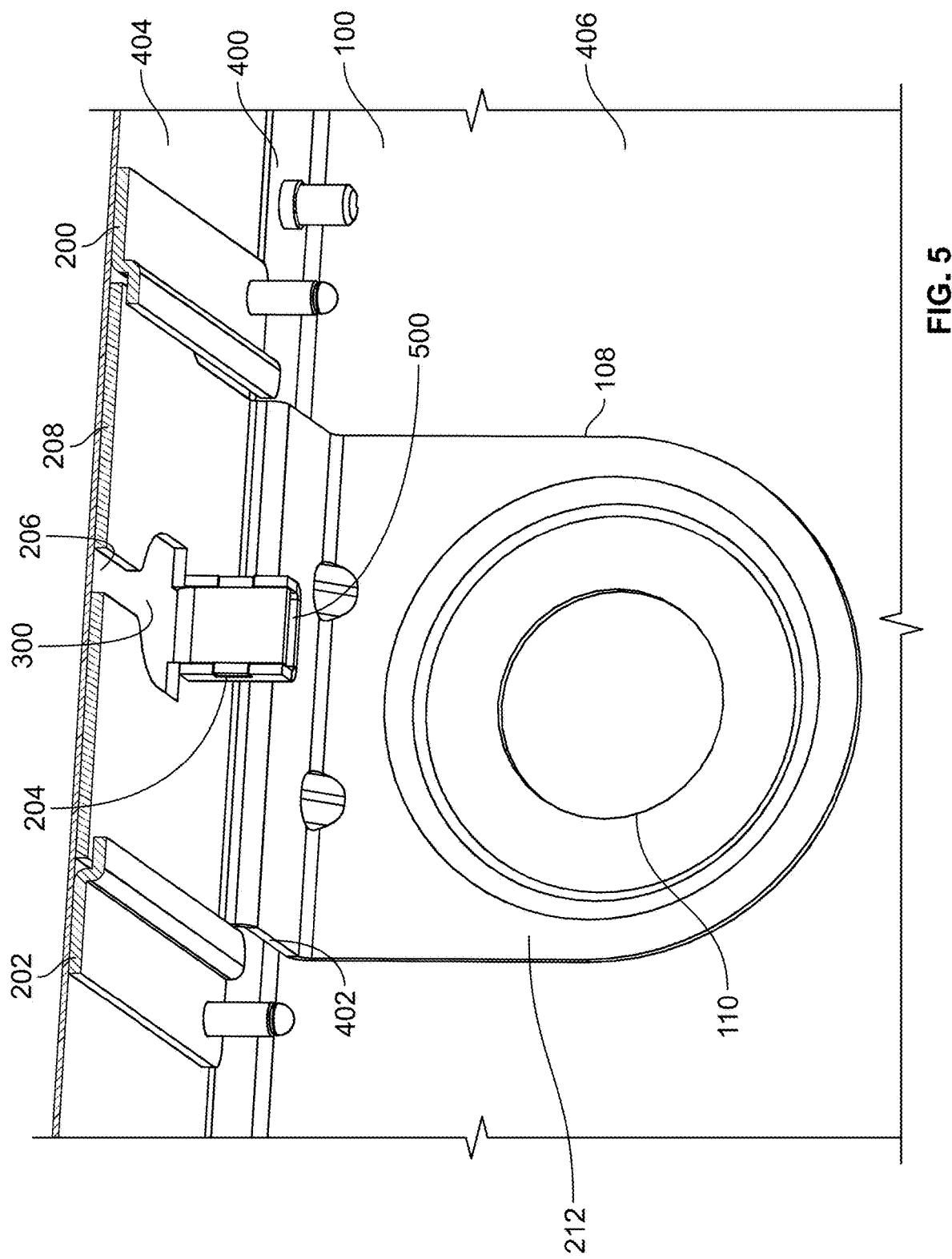
FIG. 5 shows schematically illustrative apparatus in accordance with the principles of the invention.

FIG. 5 shows an illustrative apparatus in accordance with the principles of the invention. FIG. 5 is a partial cross section through mounting base 108 and housing 100. FIG. 5 shows rails 200 and 202 engaging slider 208, but not engaging positioning bracket 402. FIG. 5 also shows recess 500 defined by engagement surface 204. Recess 500 may be configured to receive a tool and thereby facilitate movement of mounting base 108.

Figure 6:
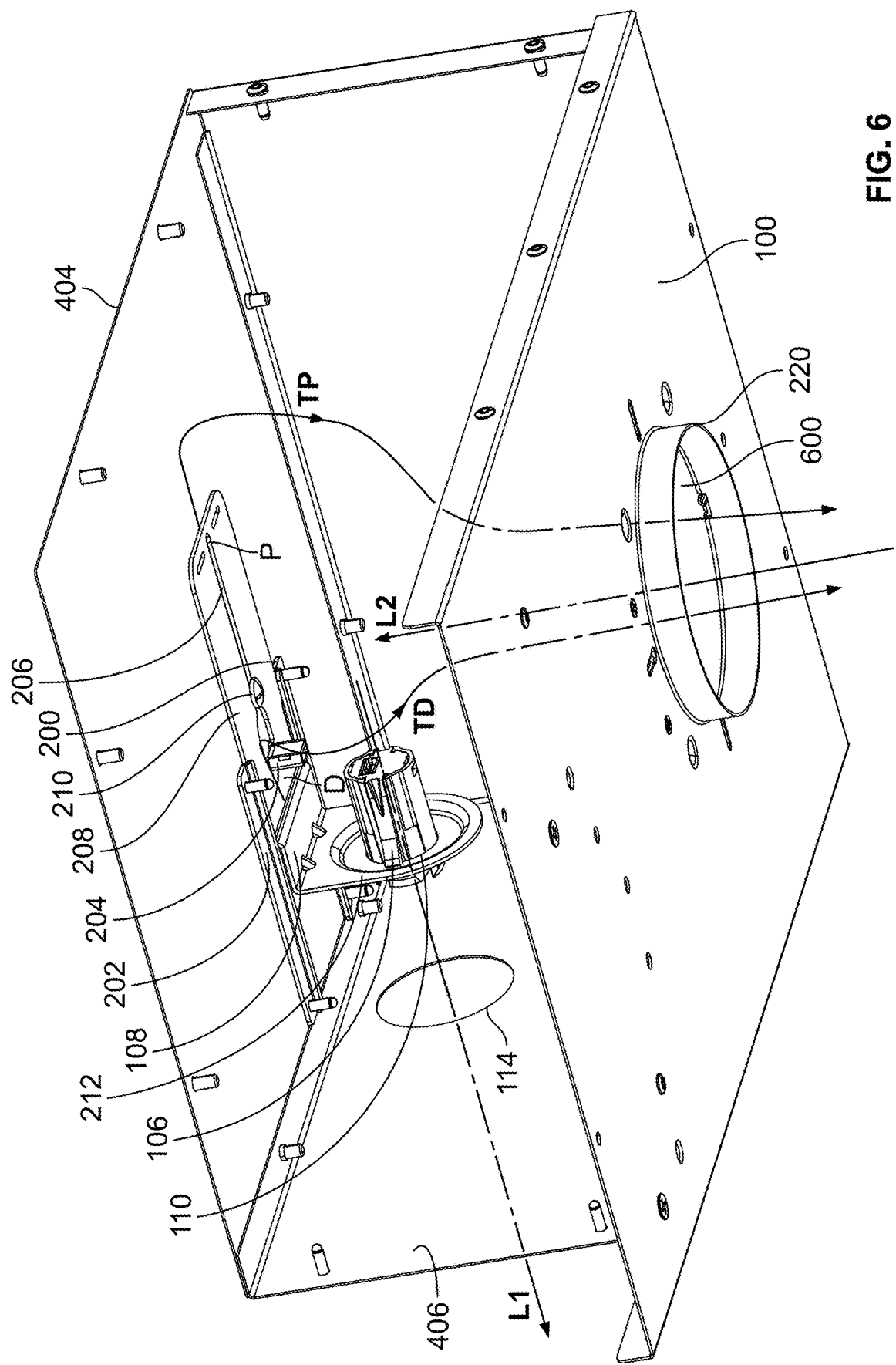
FIG. 6 shows schematically illustrative apparatus in accordance with the principles of the invention.

FIG. 6 shows an illustrative apparatus in accordance with the principles of the invention. FIG. 6 shows illustrative trajectories TD and TP that may be followed by distal end D of slider 208 and proximal end P of slider 208, respectively, during and after further motion of slider 208 in direction −L1 relative to rails 200 and 202. Mounting base 108 may be removed from housing 100 through aperture 600. Mounting base 108 may, in certain embodiments, be removed through aperture 600 even when collar 220 is disposed therein. Collar 220 may extend through the architectural structure. For example, the collar may extend through wood paneling or sheet rock.

Figure 7:
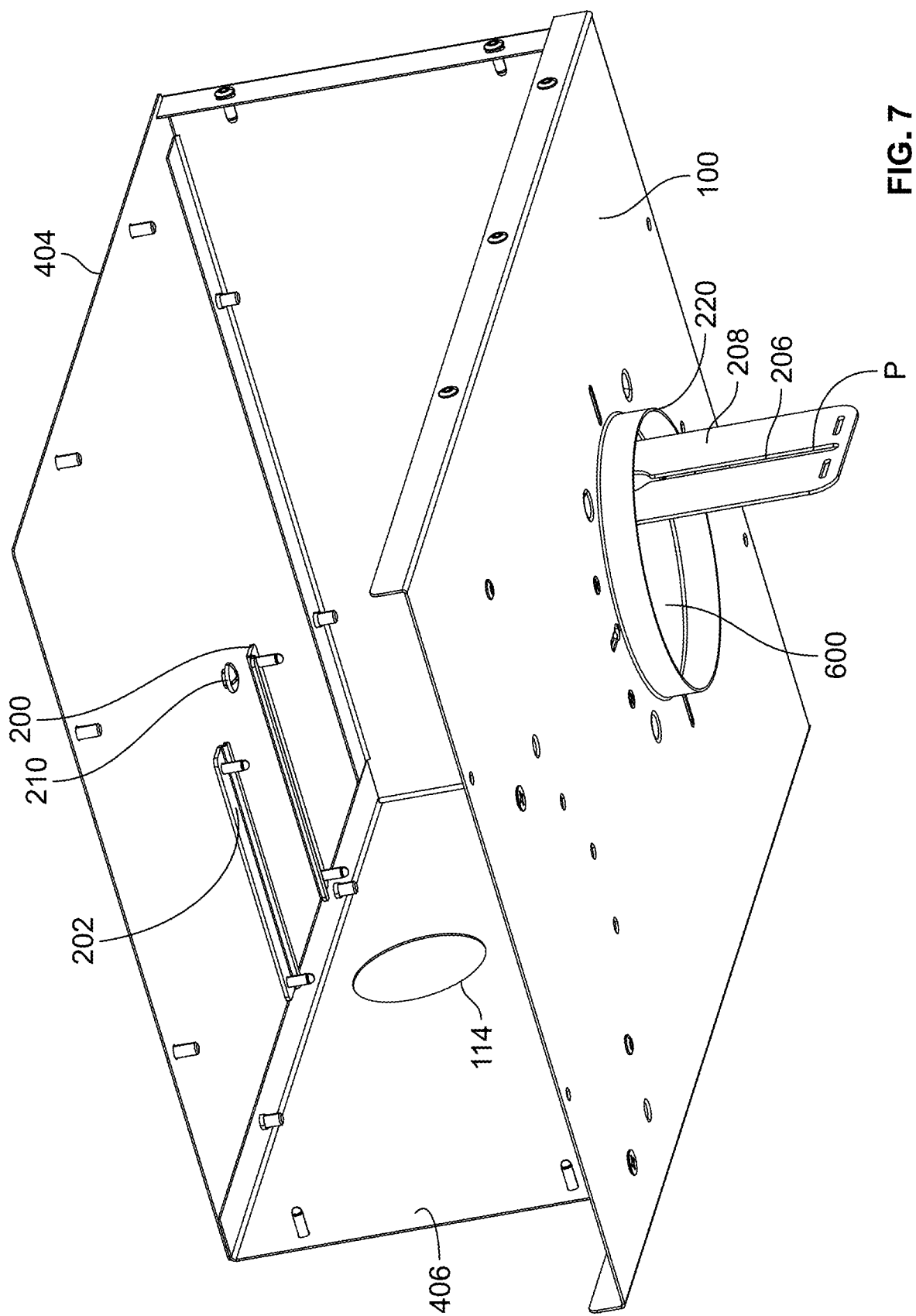
FIG. 7 shows schematically illustrative apparatus in accordance with the principles of the invention.
Figure 8:
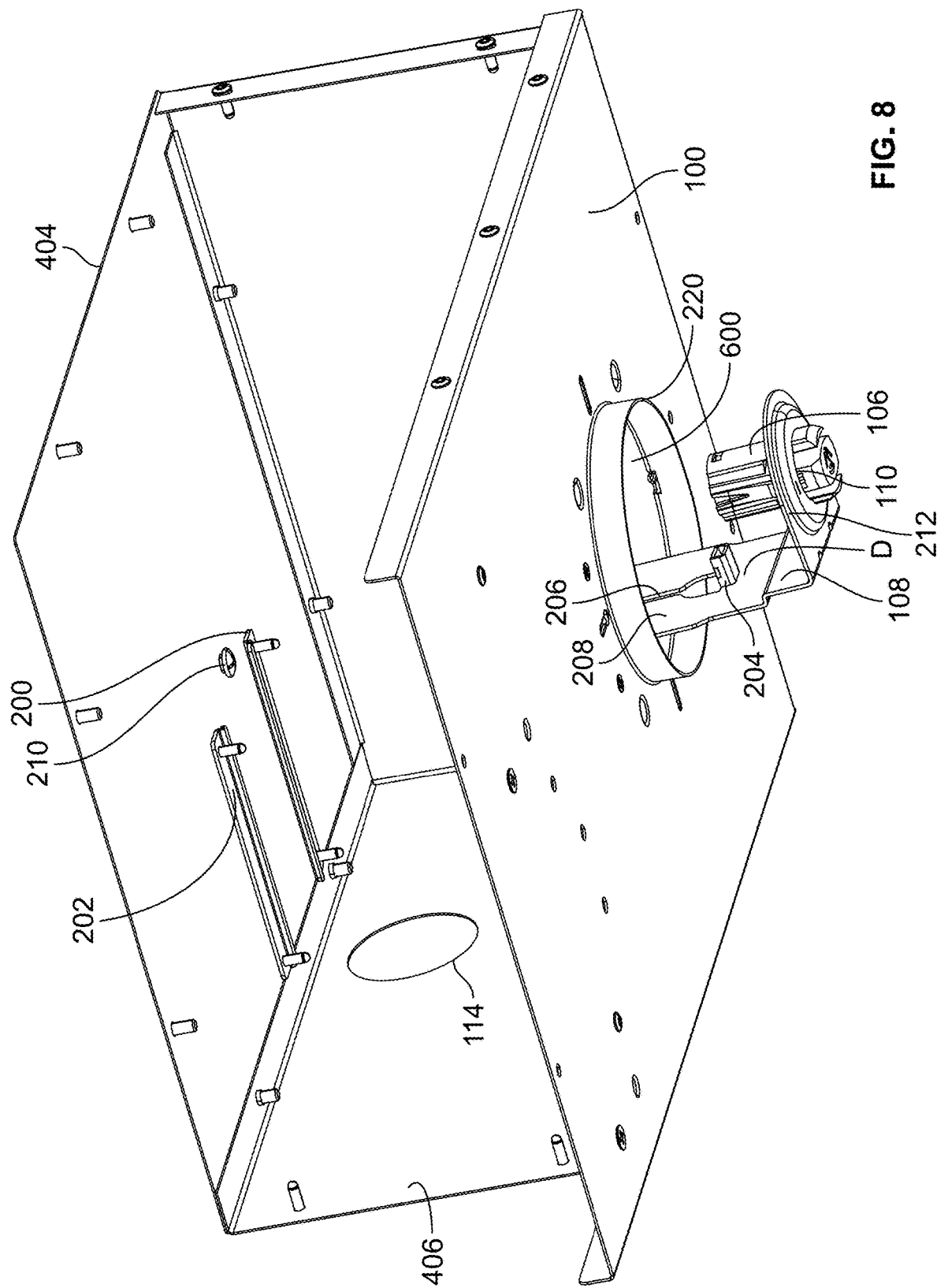
FIG. 8 shows schematically illustrative apparatus in accordance with the principles of the invention.

FIG. 7 shows mounting base 108 being removed through aperture 600 with proximal end P first (trajectory TP). FIG. 8 shows mounting base 108 being removed through aperture 600 with distal end D first (trajectory TD). Manipulating and removing mounting base 108 through aperture 600 may involve rotation of the tool engaged with engagement surface 204. The tool may be configured with a shape (e.g., an L-shape) or other feature (such as ability to flex, bend, fold, hinge, retract, collapse, or twist) to facilitate such manipulation and removal. In some embodiments, removal of mounting base 108 from housing 100 through aperture 600 may be accomplished fully or partially by hand.

Apparatus and methods for mounting an accessory are thereby provided. Method steps may include designing, preparing, manufacturing, providing, installing, configuring, or otherwise implementing aspects of the described apparatus. The apparatus may include a mounting base and a bracket. The mounting base may be supported from inside a housing. The mounting base may be movable with respect to the housing. The mounting base may be removable from the housing. The mounting base may be removable from the housing via access through the housing. The mounting base may include a projection. The projection may be seated in an orifice of the housing. The housing may include a ledge that is configured to support the projection.

The mounting base may include a through-hole. The accessory may project through the through-hole. The accessory may be disposed in the through-hole.

The mounting base may include a knock-out. The knock-out may have one or more features in common with a junction box knock-out. The knock-out may include material that is removable. Removing the material may expose the through-hole. The knock-out may be in the projection.

Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional and procedural modifications or omissions may be made without departing from the scope and spirit of the present invention.

As will be appreciated by one of skill in the art, apparatus and methods shown or described herein may be embodied in whole or in part as a method, a data processing system, or a computer program product. Accordingly, such apparatus may take the form of, and such methods may be performed by, an entirely hardware embodiment, an entirely software embodiment or an embodiment combining software, hardware and any other suitable approach or apparatus.

Apparatus and methods may involve the use of any suitable combination of elements, components, or method steps disclosed herein. Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional, and procedural modifications or omissions may be made without departing from the scope and spirit of the present invention.

One of ordinary skill in the art will appreciate that the steps shown and described herein may be performed in other than the recited order and that one or more steps illustrated may be optional.

Thus, apparatus and methods for mounting an accessory have been provided. Persons skilled in the art will appreciate that the present invention may be practiced by other than the described embodiments, which are presented for purposes of illustration rather than of limitation.

What is claimed is:

1. Apparatus for mounting an accessory, the apparatus comprising:
    a bracket that is configured to be fixed in an interior of a housing that defines an aperture for receiving a fixture; and
    a mounting base that is configured to:
        receive the accessory:
            in the interior; and
            spaced apart from the fixture; and
        be:
            engaged with and disengaged from the bracket; and
            removed from the housing through the aperture,
    wherein the mounting base:
        defines a receptacle that is configured to receive the accessory;
        includes a through-hole that passes through the receptacle; and
        is further configured to align the through-hole with an orifice in the housing.

2. The apparatus of claim 1 wherein the mounting base is further configured to releasably receive the accessory.

3. The apparatus of claim 1 wherein the mounting base is further configured to be in sliding engagement with the bracket.

4. The apparatus of claim 1 wherein the mounting base is further configured to position the through-hole outside the housing.

5. The apparatus of claim 4, wherein the mounting base includes a projection that is configured to position the through-hole outside the housing.

6. The apparatus of claim 5 wherein the mounting base includes a flange that is configured to limit a distance at which the projection can extend outside the housing.

7. The apparatus of claim 6 wherein the flange is configured to abut a panel of the housing.

8. The apparatus of claim 1 wherein the mounting base is further configured to be withdrawn from the housing, via the aperture, after removal of the fixture that was installed in the housing.

9. The apparatus of claim 1 wherein the mounting base is further configured to retain the accessory when the mounting base is removed from the housing via the aperture.

10. The apparatus of claim 1 wherein the mounting base is further configured to support the accessory in a position in which at least some of the accessory is outside the housing.

11. The apparatus of claim 1 wherein:
    the mounting base is further configured to be removed from the housing when the housing is installed behind an architectural structure; and
    removal of the mounting base from the housing does not require demolition of the architectural structure.

12. The apparatus of claim 1 wherein the mounting base includes an engagement surface that is configured to receive a tool that is configured to displace the mounting base while the mounting base is engaged with the bracket.

13. The apparatus of claim 12 wherein:
    the mounting base includes a slider that is configured to slide relative to a panel of the housing; and
    the engagement surface extends transverse to the slider.

14. The apparatus of claim 12 wherein the engagement surface is configured to maintain engagement with the tool after the tool disengages the mounting base from the bracket.

15. The apparatus of claim 14 wherein the engagement with the tool includes magnetic attraction.

16. The apparatus of claim 14 wherein the engagement with the tool is non-magnetic and includes mechanical interference between the engagement surface and the tool.

17. The apparatus of claim 14 wherein the engagement surface defines a recess that is configured to receive the tool.

18. The apparatus of claim 14 wherein the engagement with the tool is configured to manipulate the mounting base through the aperture.

19. The apparatus of claim 18 wherein the mounting base includes:
    a first segment that operationally is positioned flush against a first panel of the housing; and
    a second segment that operationally is positioned flush against a second panel of the housing.

20. The apparatus of claim 19 wherein the second panel is not co-planar with the first panel.

21. The apparatus of claim 20 wherein the second panel is orthogonal to the first panel.

22. The apparatus of claim 19 wherein a receptacle configured to receive the accessory is disposed in the first segment.

23. The apparatus of claim 19 wherein a slider that is configured to slide relative to the second panel is disposed in the second segment.

24. The apparatus of claim 19 wherein the first segment does not engage the bracket.

25. The apparatus of claim 12 further comprising a fastener having a shank;
    wherein:
        the mounting base includes a slider that:
            is configured to slide relative to a panel of the housing; and
            defines a slot that is sized for clearance of the shank; and
        the housing is configured to receive the fastener in a position in which the fastener is adjustable by an elongated linear tool inserted through the aperture.

26. The apparatus of claim 25 wherein the fastener is configured to fix the mounting base relative to the housing.

27. The apparatus of claim 25 wherein the slider defines a release hole that is configured to pass a head of the fastener when the release hole is aligned with the fastener.

28. Apparatus for mounting an accessory, the apparatus comprising:
    a bracket that is configured to be fixed in an interior of a housing that defines an aperture for receiving a fixture;
    a mounting base that is configured to:
        receive the accessory:
            in the interior; and
            spaced apart from the fixture; and
        be:
            engaged with and disengaged from the bracket; and
            removed from the housing through the aperture; and
    a fastener having a shank;
    wherein:
        the mounting base includes a slider that:
            is configured to slide relative to a panel of the housing; and
            defines a slot that is sized for clearance of the shank; and
        the housing is configured to receive the fastener in a position in which the fastener is adjustable by an elongated linear tool inserted through the aperture.

29. The apparatus of claim 28 wherein the fastener is configured to fix the mounting base relative to the housing.

30. The apparatus of claim 28 wherein the slider defines a release hole that is configured to pass a head of the fastener when the release hole is aligned with the fastener.

\* \* \* \* \*